US011221726B2

(12) United States Patent
Qiu et al.

(10) Patent No.: US 11,221,726 B2
(45) Date of Patent: Jan. 11, 2022

(54) MARKER POINT LOCATION DISPLAY METHOD, ELECTRONIC DEVICE, AND COMPUTER-READABLE STORAGE MEDIUM

(71) Applicant: Tencent Technology (Shenzhen) Company Limited, Shenzhen (CN)

(72) Inventors: Meng Qiu, Shenzhen (CN); Junming Wang, Shenzhen (CN); Jiaqi Pan, Shenzhen (CN); Ya Zhang, Shenzhen (CN); Shuting Zhang, Shenzhen (CN); Qinghua Xiao, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 0 days.

(21) Appl. No.: 16/888,142

(22) Filed: May 29, 2020

(65) Prior Publication Data

US 2020/0293154 A1 Sep. 17, 2020

Related U.S. Application Data

(63) Continuation of application No. PCT/CN2019/077294, filed on Mar. 7, 2019.

(30) Foreign Application Priority Data

Mar. 22, 2018 (CN) .......................... 201810241937.6

(51) Int. Cl.
*G06F 3/00* (2006.01)
*G06F 3/0481* (2013.01)
(Continued)

(52) U.S. Cl.
CPC ........ *G06F 3/0481* (2013.01); *A63F 13/2145* (2014.09); *A63F 13/426* (2014.09);
(Continued)

(58) Field of Classification Search
CPC .............. G06F 3/0481; G06F 3/04842; A63F 13/5378; A63F 13/5372; A63F 13/533; A63F 13/426; A63F 13/214
See application file for complete search history.

(56) References Cited

U.S. PATENT DOCUMENTS 6,079,982 A * 6/2000 Meader ................... A63F 13/08
434/29
6,179,619 B1 * 1/2001 Tanaka ..................... A63G 7/00
434/307 R
(Continued)

FOREIGN PATENT DOCUMENTS

CN 107715454 A 2/2018
CN 107741818 A 2/2018
(Continued)

OTHER PUBLICATIONS

Xaero's Minimap Mod! | Minecraft Mod Showcase! (https://www.youtube.com/watch?v=Jn7wT0qd-XI) Mar. 14, 2017 (Year: 2017).*
(Continued)

*Primary Examiner* — Nicholas Augustine
(74) *Attorney, Agent, or Firm* — Morgan, Lewis & Bockius LLP

(57) ABSTRACT

The present disclosure discloses a method for displaying a marker point location performed at an electronic device. In the present disclosure, a marker point location in a global map of a virtual scene is obtained; a target scene area indicated by the marker point location in the virtual scene is determined; a prompt signal is displayed in a viewing angle image of a currently controlled object, the prompt signal being used for prompting a location of the target scene area in the virtual scene, and the viewing angle image being a virtual scene observable in a viewing angle range of the currently controlled object in the virtual scene; and accuracy
(Continued)

of marker point location display is improved by marking the target scene area in the virtual scene.

20 Claims, 11 Drawing Sheets

(51) Int. Cl.
    *A63F 13/2145* (2014.01)
    *A63F 13/426* (2014.01)
    *A63F 13/533* (2014.01)
    *A63F 13/5372* (2014.01)
    *A63F 13/5378* (2014.01)
    *G06F 3/0484* (2013.01)
    *G06F 3/01* (2006.01)

(52) U.S. Cl.
    CPC ........ *A63F 13/533* (2014.09); *A63F 13/5372* (2014.09); *A63F 13/5378* (2014.09); *G06F 3/04842* (2013.01); *A63F 2300/1075* (2013.01); *A63F 2300/305* (2013.01); *A63F 2300/306* (2013.01); *A63F 2300/307* (2013.01); *A63F 2300/6045* (2013.01)

(56) References Cited

U.S. PATENT DOCUMENTS

| | | | | |
|---|---|---|---|---|
| 7,788,323 | B2* | 8/2010 | Greenstein | G06T 19/00 709/204 |
| 7,804,507 | B2* | 9/2010 | Yang | A63F 13/213 345/633 |
| 7,817,150 | B2* | 10/2010 | Reichard | G06Q 50/04 345/419 |
| 2004/0113887 | A1* | 6/2004 | Pair | G09B 25/08 345/156 |
| 2004/0193441 | A1* | 9/2004 | Altieri | A63F 13/65 709/203 |
| 2007/0010325 | A1 | 1/2007 | Suzuki et al. | |
| 2008/0030429 | A1* | 2/2008 | Hailpern | A63F 13/213 345/8 |
| 2008/0125218 | A1* | 5/2008 | Collins | G06Q 90/00 463/31 |
| 2008/0246693 | A1* | 10/2008 | Hailpern | A63F 13/52 345/8 |
| 2009/0076791 | A1* | 3/2009 | Rhoades | A63F 13/12 703/21 |
| 2009/0091583 | A1* | 4/2009 | McCoy | A63F 13/02 345/633 |
| 2014/0171039 | A1* | 6/2014 | Bjontegard | H04L 67/38 455/414.1 |
| 2016/0148417 | A1* | 5/2016 | Kim | G06T 19/006 345/419 |
| 2016/0242010 | A1* | 8/2016 | Parulski | H04L 67/22 |

FOREIGN PATENT DOCUMENTS

| | | |
|---|---|---|
| CN | 108465240 A | 8/2018 |
| JP | 0981772 A | 3/1997 |
| JP | 10113466 A | 5/1998 |
| JP | 2006162552 A | 6/2006 |
| JP | 2008070705 A | 3/2008 |
| JP | 2011214861 A | 10/2011 |

OTHER PUBLICATIONS

Tencent Technology, ISR, PCT/CN2019/077294, May 23, 2019, 2 pgs.
Tencent Technology, WO, PCT/CN2019/077294, May 23, 2019, 4 pgs.
Tencent Technology, IPRP, PCT/CN2019/077294, Sep. 22, 2020, 5 pgs.

\* cited by examiner

MARKER POINT LOCATION DISPLAY METHOD, ELECTRONIC DEVICE, AND COMPUTER-READABLE STORAGE MEDIUM

CROSS REFERENCE TO RELATED APPLICATIONS

This application is a continuation application of PCT Application No. PCT/CN2019/077294, entitled "METHOD FOR DISPLAYING MARKER POINT POSITION, ELECTRONIC DEVICE, AND COMPUTER READABLE STORAGE MEDIUM" filed on Mar. 7, 2019, which claims priority to Chinese Patent Application No. 201810241937.6, entitled "MARKER POINT LOCATION DISPLAY METHOD AND APPARATUS, TERMINAL, AND COMPUTER-READABLE STORAGE MEDIUM" filed with the Chinese National Intellectual Property Administration on Mar. 22, 2018, all of which are incorporated by reference in their entirety.

FIELD OF THE TECHNOLOGY

Embodiments of the present disclosure relate to the field of computer technologies, and in particular, to a method for displaying a marker point location, an electronic device, and a computer-readable storage medium.

BACKGROUND OF THE DISCLOSURE

Currently, in some games, due to a limitation of a terminal screen size, a virtual scene of an area in which a user's current location is located is usually displayed in full screen on a current display interface, and a global map is displayed in an upper right corner of the current display interface, and the global map covers an area included in the game. When a plurality of users team up for a game, usually, a specific selects a destination in the global map, and marks the destination as a marker point location. The user transmits the marker point location to users, other than the user, in the plurality of users, so that the plurality of users may arrive at the marker point location in the virtual scene.

In the related art, using a specific user in a team as an example, a process in which a terminal displays the marker point location may be that: after the user selects a specific marker point location in the global map, the terminal displays the marker point location and a current location of the user in the global map. Usually, the user may move toward a direction of the marker point location in the virtual scene. While moving, the terminal may synchronously display a process of the current location gradually getting closer to the marker point location in the global map, and when the user manually observes that the current location coincides with the marker point location, arrival at the marker point location in the virtual scene is determined.

The foregoing method is actually manual determining whether the marker point location is arrived at. However, because accuracy of the global map is lower than that of the virtual scene, a point in the global map actually represents a virtual area with a relatively large display area in the virtual scene, for example, a city or a park. If the current location is located outside the marker point location in the area, the user may possibly observe that the current location and the marker point location coincide with each other in the global map. In this case, the user does not arrive at the marker point location in the virtual scene, resulting in relatively low accuracy of marker point location display.

SUMMARY

Embodiments of the present disclosure provide a method for displaying a marker point location performed at an electronic device, and a computer-readable storage medium, to resolve a problem of relatively low accuracy of marker point location display. The technical solutions are as follows:

According to one aspect, a method for displaying a marker point location is performed at an electronic device, the method including:

obtaining a marker point location in a global map of a virtual scene, the global map being configured to display a thumbnail of the virtual scene;

determining a target scene area indicated by the marker point location in the virtual scene, the target scene area being an area marked by the marker point location; and displaying a prompt signal in a viewing angle image of a currently controlled object, the prompt signal being used for prompting a location of the target scene area in the virtual scene, and the viewing angle image being a virtual scene observable in a viewing angle range of the currently controlled object in the virtual scene.

According to another aspect, a marker point location display apparatus is provided, the apparatus including:

an obtaining module, configured to obtain a marker point location in a global map of a virtual scene, the global map being configured to display a thumbnail of the virtual scene;

a determining module, configured to determine a target scene area indicated by the marker point location in the virtual scene, the target scene area being an area marked by the marker point location; and a display module, configured to display a prompt signal in a viewing angle image of a currently controlled object, the prompt signal being used for prompting a location of the target scene area in the virtual scene, and the viewing angle image being a virtual scene observable in a viewing angle range of the currently controlled object in the virtual scene.

According to another aspect, an electronic device is provided, the electronic device including a processor and a memory, the memory storing at least one instruction, the instruction being loaded and executed by the processor to implement the operations performed in the foregoing method for displaying a marker point location.

According to another aspect, a non-transitory computer-readable storage medium is provided, the storage medium storing at least one instruction, the instruction being loaded and executed by a processor to implement the operations performed in the foregoing method for displaying a marker point location.

In the embodiments of the present disclosure, when the terminal obtains the marker point location in the global map, the terminal may display the prompt signal in the viewing angle image of the currently controlled object based on the target scene area indicated by the marker point location in the virtual scene, to mark the location of the target scene area in the virtual scene clearly and accurately, so that the currently controlled object may arrive at the target scene area accurately and quickly according to the prompt signal, thereby improving accuracy of actual display of the marker point location greatly.

BRIEF DESCRIPTION OF THE DRAWINGS

To describe the technical solutions in the embodiments of the present disclosure more clearly, the following briefly describes the accompanying drawings required for describing the embodiments. Apparently, the accompanying drawings in the following description show merely some embodiments of the present disclosure, and a person of ordinary skill in the art may still derive other drawings from the accompanying drawings without creative efforts.

DESCRIPTION OF EMBODIMENTS

Figure 1:
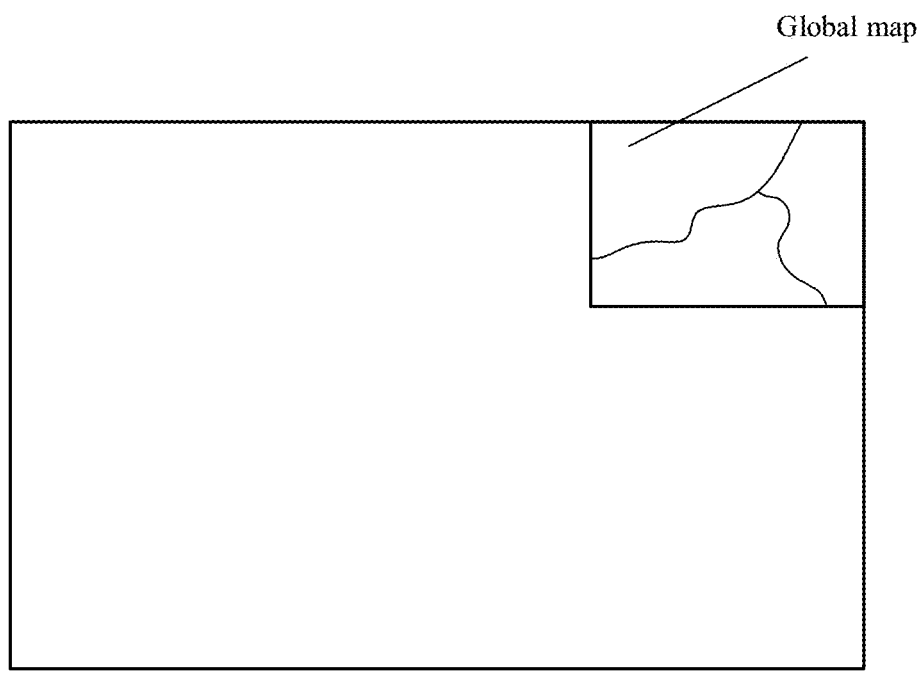
FIG. 1 is a schematic diagram of a display interface according to an embodiment of the present disclosure.

The following clearly and completely describes the technical solutions in the embodiments of the present disclosure with reference to the accompanying drawings in the embodiments of the present disclosure. Apparently, the described embodiments are some of the embodiments of the present disclosure rather than all of the embodiments. All other embodiments obtained by a person of ordinary skill in the art based on the embodiments of the present disclosure without creative effects shall fall within the protection scope of the present disclosure.

Embodiments of the present disclosure mainly relate to an electronic game scene. In the electronic game scene, a user may perform an operation on a terminal in advance, and the terminal may download a game configuration file of the electronic game after detecting the operation of the user. The game configuration file may include an application, interface display data, virtual scene data, or the like of the electronic game. When the user logs in to the electronic game on the terminal, the terminal may call the game configuration file, to render and display an electronic game interface based on the configuration file. The user may perform a touch operation on the terminal, and after detecting the touch operation, the terminal may determine game data corresponding to the touch operation and render and display the game data. The game data may include virtual scene data, behavioral data of a virtual object in the virtual scene, and the like.

The virtual scene included in the present disclosure may be used for simulating a virtual space, and the virtual space may be a three-dimensional virtual space or a two-dimensional virtual space. The virtual space may be an open space. The virtual scene may be used for simulating an actual environment in reality. For example, the virtual scene may include sky, land, ocean, and the like, and the land may include environmental factors such as a desert and a city. The user may control a virtual object to move in the virtual scene, the virtual object may be a virtual avatar used for representing the user in the virtual scene, and the avatar may be in any form, for example, a person or an animal, and is not limited in the embodiments of the present disclosure. Using a shooting game as an example, in the virtual scene, the user may control the virtual object to fall freely, glide, or fall after a parachute is opened in the sky; or to run, jump, creep, bend forward in the land; or control the virtual object to swim, float, or dive in the ocean. Certainly, the user may further control the virtual object to ride in a vehicle to move in the virtual scene. The foregoing scenes are used as an example only herein, and are not specifically limited in the embodiments of the present disclosure. The user may alternatively control the virtual object to fight against another virtual object by using a weapon. The weapon may be a cold weapon, or may be a hot weapon. This is not specifically limited in the present disclosure.

Usually, the user may select one destination in the global map, and control the currently controlled object to arrive at the destination in the virtual scene. The user may team up for a game with other users, that is, the currently controlled object builds an association relationship with other object in a team, and the destination may be selected by any controlled object in the team. A terminal may perform a data exchange with a terminal of the controlled object selecting the destination to obtain a destination selected by an associated object, to mark the destination in the global map.

The terminal may display the virtual scene in full screen on the current display interface, and independently display the global map in a preset area in the current display interface. The global map is configured to display a thumbnail of the virtual scene, the thumbnail being used for describing geographic features, such as terrain, a landform, and a geographic location, corresponding to the virtual scene. The preset area may be set according to users' operation habits. For example, as shown in FIG. 1, the preset area may be a rectangular area in an upper right corner, a lower left corner, or the like of the current display interface.

In addition, the terminal may be any terminal on which the application is installed, and is not specifically limited in the embodiments of the present disclosure. For example, the terminal may be any device on which the application is installed, for example, a mobile phone terminal, a portable android device (PAD) terminal, or a computer terminal.

Figure 2:
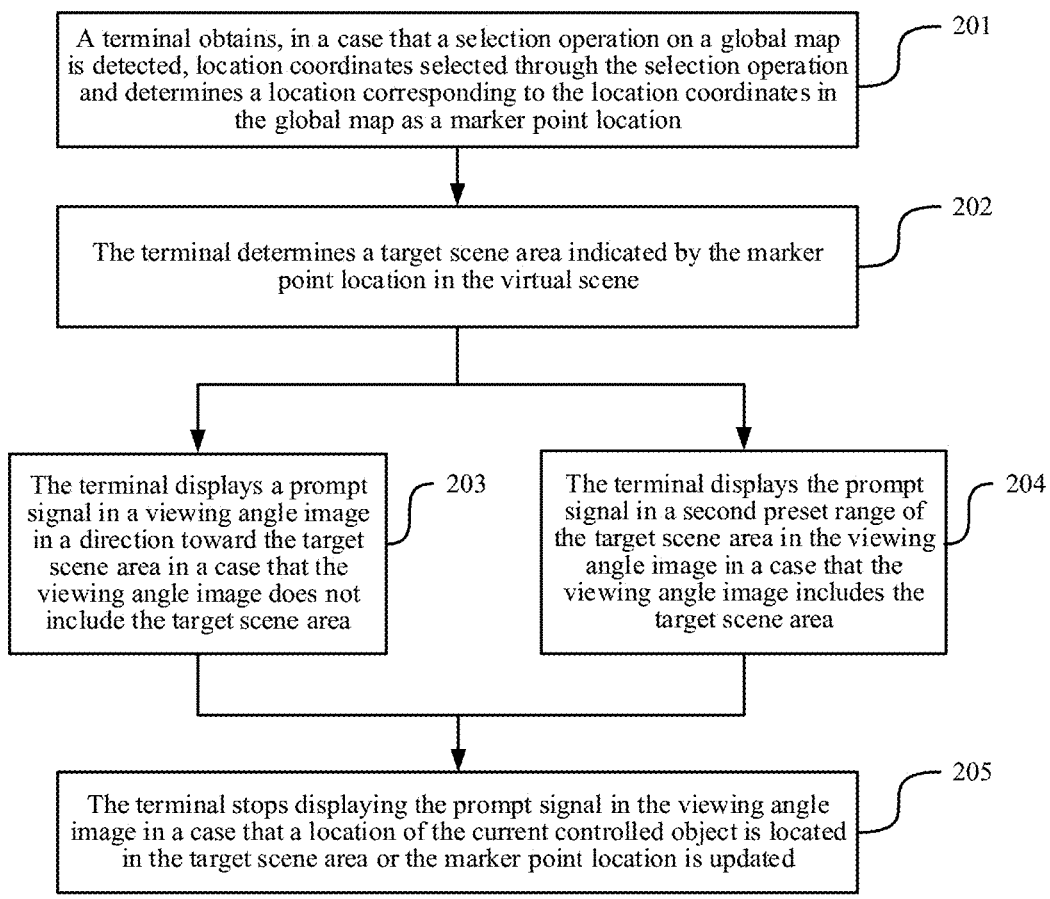
FIG. 2 is a flowchart of a method for displaying a marker point location according to an embodiment of the present disclosure.

FIG. 2 is a flowchart of a method for displaying a marker point location according to an embodiment of the present disclosure. The method is applied to an electronic device, and in the embodiments of the present disclosure, only an example in which the electronic device is a terminal is used for description, and the execution body of the method may be a terminal. With reference to FIG. 2, the method includes the following steps.

201. The terminal obtains, in a case that a selection operation on a global map is detected, location coordinates selected through the selection operation and determines a location corresponding to the location coordinates in the global map as the marker point location.

In the embodiments of the present disclosure, the marker point location is a location selected in the global map. During the game, when the user wants to arrive at a destination, the user may select the destination in the global map and mark the destination as a marker point, and then the marker point location is a location of the destination in the global map. The marker point location may be represented by location coordinates in the global map. The terminal may obtain location coordinates of the marker point in the global map, and determines a location corresponding to the location coordinates in the global map as the marker point location.

The marker point location may be selected based on a selection operation of a current user. The selection operation may be an operation triggered by a touch event of the user's finger, or may be an operation triggered by a click event of a mouse or another input device. Therefore, the step may be that: when the terminal detects occurrence of a touch event or a click event in the global map, the terminal determines that there is a selection operation in the global map, obtains location coordinates of the touch event or the click event in the global map, and determines the location coordinates as location coordinates selected through the selection operation.

Figure 3:
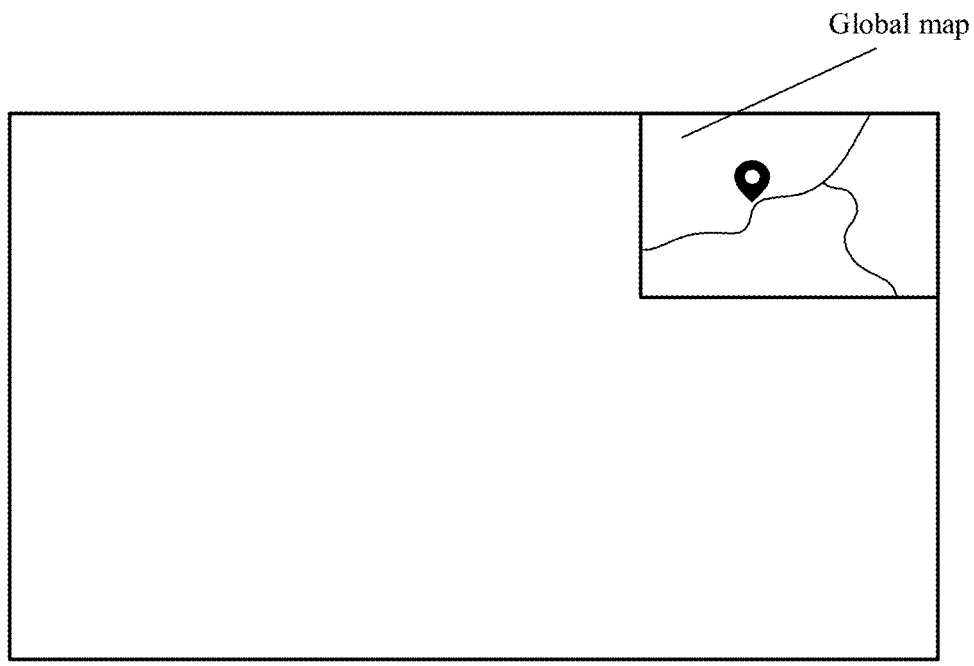
FIG. 3 is a schematic diagram of a display interface according to an embodiment of the present disclosure.
Figure 4:
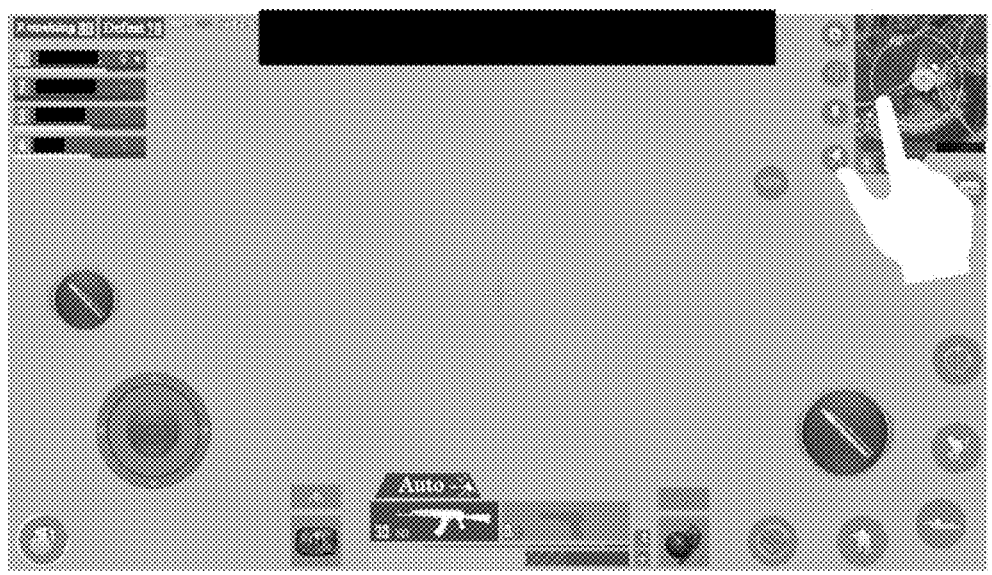
FIG. 4 is an example diagram of a display interface according to an embodiment of the present disclosure.

The terminal may mark the marker point location in a manner of adding a preset icon, the terminal may add the preset icon at the marker point location, or may add the preset icon at any location in a current display interface, and display indication information of the preset icon, the indication information being used for indicating a preset icon of the marker point location, to prevent the preset icon not from shielding a surrounding area of the marker point location. The preset icon may be a water droplet icon, an arrow, or the like. As shown in FIG. 3, the terminal may display the global map in an upper right corner of the current display interface, and when the user selects a marker point location in a global map with a finger, the terminal may mark the water droplet icon at the location. FIG. 4 is a schematic diagram of an actual terminal interface display, and with reference to a schematic diagram of effect comparison shown in FIG. 4, a specific display effect thereof may be seen more obviously.

In a possible implementation, the user may team up for a game with other users. Therefore, when a plurality of users are playing a game, association relationships may be built between controlled objects controlled by the plurality of users respectively. The marker point location may be selected by any object in the plurality of controlled objects, and the controlled object selecting the marker point location shares the marker point location with associated controlled objects. When the marker point location is selected by an associated object of the currently controlled object, step 201 may be replaced with that: the terminal receives the marker point location selected by the associated object of the currently controlled object. The associated object may transmit location coordinates of the marker point location directly. The terminal receives the location coordinates transmitted by a terminal of the associated object, and determines a location corresponding to the location coordinates in the global map as the marker point location.

The selection of the associated object is also a selection of an associated user that builds an association relationship with the user. Certainly, the selection procedure of the associated object is similar to the selection procedure performed through the selection operation of the current user, and details are not described herein again.

In a possible implementation, the terminal may display the global map only when receiving a display instruction triggered by the user. When a selection operation on the global map is detected, a step that the terminal obtains the location coordinates selected through the selection operation may be that: when detecting the display instruction instructing to display the global map, the terminal displays the global map in a preset area in the current display interface, and when detecting the selection operation on the global map, the terminal obtains the location coordinates selected through the selection operation on the global map.

The display instruction may be triggered by a display button in the current display interface of the terminal, specified speech, or a specified action, a shake or a rotation, performed by the user on the terminal.

Furthermore, when displaying the global map in the preset area, the terminal may further detect whether the user needs to perform the selection operation in the global map, and if the user needs to perform the selection operation on the global map, the terminal may further zoom in and display the global map, so that the user may perform selection on the zoomed-in and displayed global map. Correspondingly, when a selection operation on the global map is detected, the step that the terminal obtains the location coordinates selected through the selection operation may further be that: when detecting a trigger operation on the preset area of the terminal, the terminal switches from a first window to a second window to display the global map; and when detecting a selection operation on the global map in the second window, the terminal obtains location coordinates selected through the selection operation.

A display area of the second window is larger than that of the first window, and the trigger operation is a touch event of a finger in the preset area or a click event of a mouse in the preset area. The preset area may be set based on requirements. For example, the preset area may be an entire area occupied by the first window, or a center area or an edge area of the area occupied by the first window. The first window may be an upper-right-corner area, a lower-left-corner area, or the like in the current display interface. The second window may be a left-half screen area or a right-half screen area of the current display interface.

The global map may be located in a part of the screen area such as an upper right corner or a lower right corner of the terminal screen, and the terminal switches to an area with a larger display area to display the global map, thereby releasing a limitation of a terminal screen size, improving accuracy of selecting the marker point location, and improving user experience.

Figure 5:
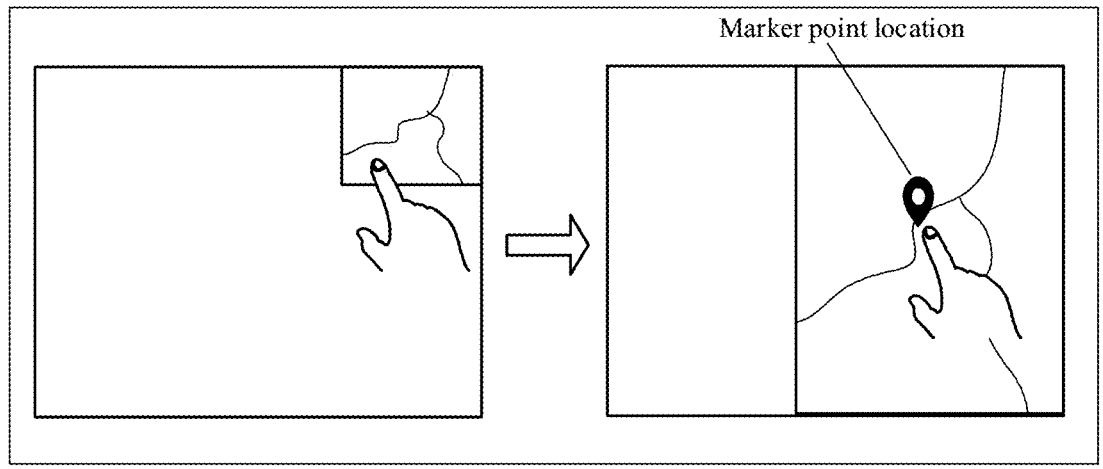
FIG. 5 is a schematic diagram of a display interface according to an embodiment of the present disclosure.
Figure 6:
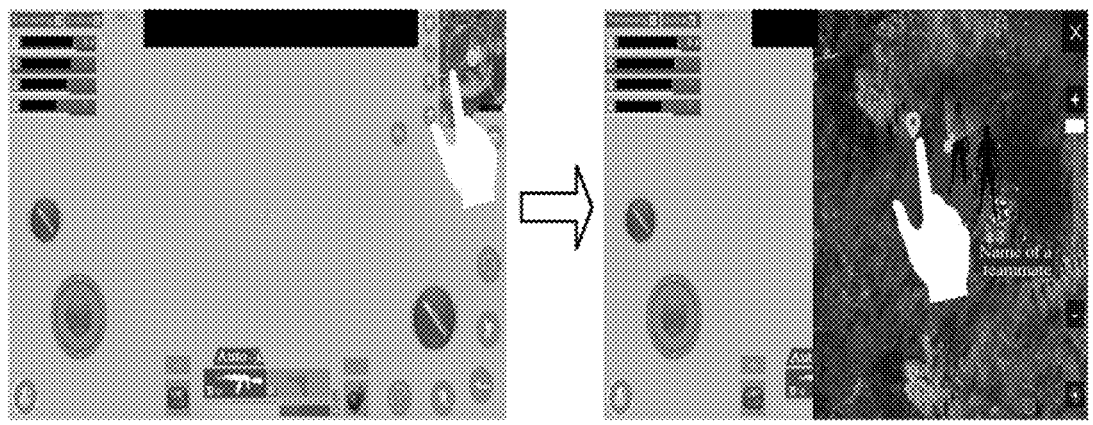
FIG. 6 is an example diagram of a display interface according to an embodiment of the present disclosure.

As shown in FIG. 5, the terminal may first display the global map in the upper right corner of the terminal screen, as shown in the left figure. When the user touches the upper right corner area with a finger, the terminal may further switch to display the global map in a right half screen area, as shown in the right figure. As shown in FIG. 5, the terminal may further display a location of the currently controlled object in the global map, so that the user may directly observe a location relationship between a current location of the currently controlled object and the marker point location. Furthermore, as shown in FIG. 5, the terminal may further display a current movement direction of the currently controlled object in the global map, so that the user may adjust the current movement direction based on the marker point location in time, to avoid detours and other situations, to arrive at the marker point location as soon as possible. FIG. 6 is a schematic diagram of an actual terminal interface display, and with reference to a schematic diagram of effect comparison shown in FIG. 6, a specific display effect thereof may be seen more obviously.

Figure 7:
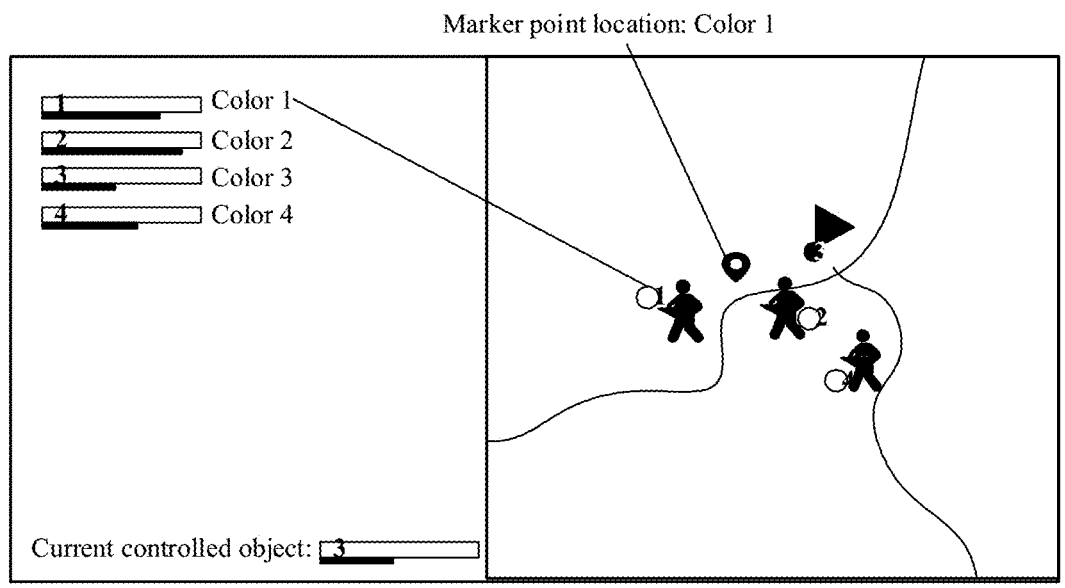
FIG. 7 is a schematic diagram of a display interface according to an embodiment of the present disclosure.
Figure 8:
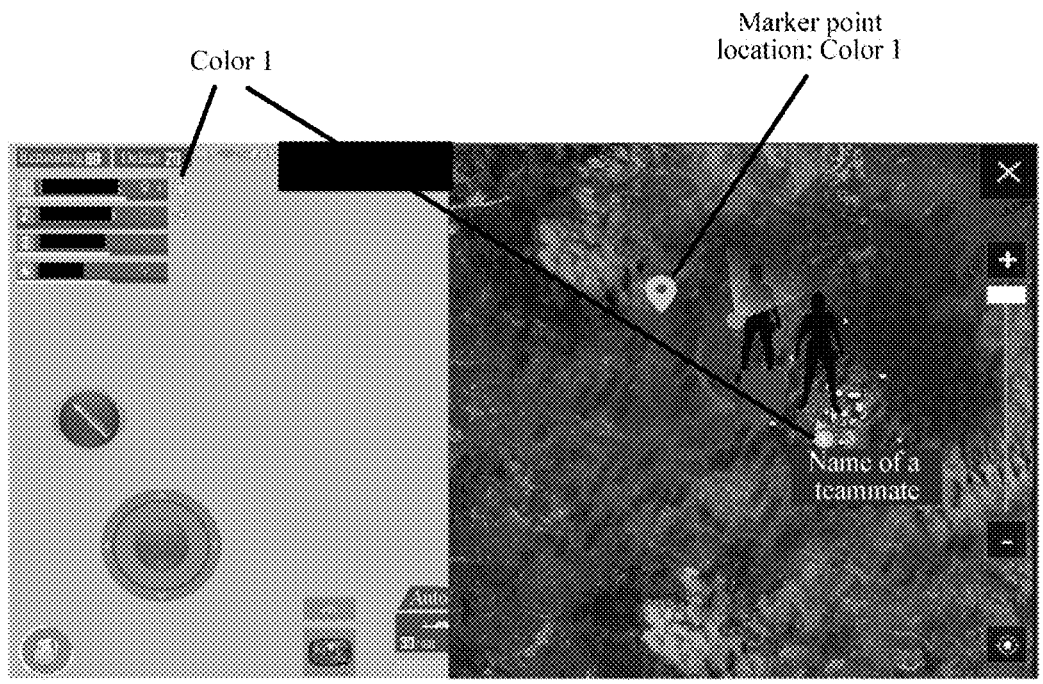
FIG. 8 is an example diagram of a display interface according to an embodiment of the present disclosure.

As shown in FIG. 7, the terminal may mark locations of the currently controlled object and the associated object in the global map. In addition, the terminal may further set a current color of the marker point location to a color of a location marker of an associated object selecting the marker point, so that the user may visually learn of the object selecting the marker point location at a visual angle. FIG. 8 is a schematic diagram of actual terminal interface display, and with reference to a schematic diagram of effect comparison shown in FIG. 5b, a specific display effect thereof may be seen more obviously.

When the marker point location is selected by the currently controlled object, and if the currently controlled object has built an association relationship with another object, the currently controlled object may further need to share the marker point location with the associated object. The process may be that: the terminal obtains an object identifier of the associated object, and transmits the marker point location to the associated object according to the object identifier. The object identifier may be, for example, a game identity (ID) or a nickname of the associated object. The terminal is communicatively connected to a server, and the terminal may transmit the marker point location to the server. The server forwards the marker point location to a terminal at which the associated object is located. Alternatively, the terminal may be communicatively connected to the terminal at which the associated object is located directly, for example, through a Bluetooth connection or a near field communication (NFC) connection, and then the terminal directly transmits the marker point location to the terminal at which the associated object is located based on the communication connection.

Certainly, when obtaining the marker point location, the terminal may first mark the marker point location in the global map, and then transmit the marker point location to the associated object, or may first transmit the marker point location to the associated object, and then mark the marker point location. Alternatively, the terminal may transmit and mark the marker point location simultaneously. The above is not specifically limited in the embodiments of the present disclosure.

In the embodiments of the present disclosure, after obtaining the marker point location, the terminal may determine a target scene area indicated by the marker point location and mark the target scene area in a virtual scene based on the location of the marker point location in the global map through step 202 below, so that the currently controlled object can clearly learn of the marker point location.

202. The terminal determines a target scene area indicated by the marker point location in the virtual scene.

The target scene area is an area marked by the marker point location, and the global map displays a thumbnail of the virtual scene. There is a mapping relationship between the global map and the virtual scene, the terminal may store the mapping relationship in advance, and the terminal determines, based on the mapping relationship, the target scene area indicated by the marker point location in the virtual scene.

The mapping relationship may be a mapping relationship between a location point in the global map and a location point in the virtual scene, or may be a mapping relationship between the location point in the global map and a scene area in the virtual scene. Based on several possibilities of the mapping relationship, the step may be implemented through in the following three manners.

According to a first manner, the terminal determines scene location coordinates corresponding to the marker point location in the virtual scene according to location coordinates of the marker point location in the global map, and determines an area within a first preset range of the scene location coordinates as the target scene area.

In this step, the terminal may store a mapping relationship between the location coordinates in the global map and the scene location coordinates in the virtual scene in advance. The terminal obtains, according to the location coordinates of the marker point location in the global map, the scene location coordinates corresponding to the marker point location in the virtual scene from the mapping relationship; and the terminal uses, according to the scene location coordinates, the area in the first preset range corresponding to the scene location coordinates as the target scene area in accordance with a preset generation principle.

Figure 9:
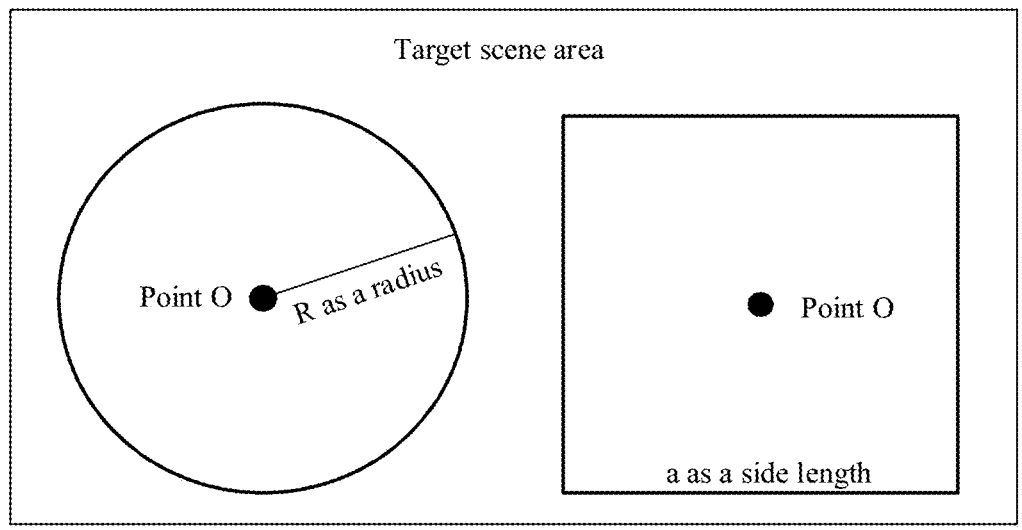
FIG. 9 is a schematic diagram of a display interface according to an embodiment of the present disclosure.

The preset generation principle may be set according to requirements, and is not specifically limited in the embodiments of the present disclosure. For example, the preset generation principle may be an area with the scene location coordinates as a center of a circle and a preset distance as a radius, as shown in FIG. 9, and the area in the first preset range is a circular area with O as a center of a circle and R as a radius. Alternatively, the preset generation principle may be a square with the scene location coordinates as a center and a preset distance as a side length, and the area in the first preset range is a square area with O as a center and a as a side length.

The terminal pinpoints the marker point location to a location point in the virtual scene, and expands the location point into an area within a specific area range based on the location point, so that the target scene area in the virtual scene may be determined accurately, thereby improving the current user's recognition on the target scene area and improving user experience.

According to a second manner, the terminal determines scene location coordinates of the marker point location in the virtual scene according to location coordinates of the marker point location in the global map, and determines an area corresponding to a ground object element at the scene location coordinates as the target scene area.

In this step, the terminal may further store a mapping relationship between the scene location coordinates and the ground object element. The terminal determines scene location coordinates of the marker point location in the virtual scene, and determines a ground object element corresponding to the scene location coordinates from the mapping relationship between the scene location coordinates and the ground object element according to the scene location coordinates, and uses an area at which the ground object element is located as the target scene area.

The ground object element may be an element with a specific outline or an architectural structure in the virtual scene. For example, the ground object element may be a lake, a park, a villa, a hospital, or the like. The manner in which the terminal determines the scene location coordinates of the marker point location in the virtual scene is similar to the foregoing first manner, and details are not described herein again.

The terminal may correspond the marker point location to a specific ground object element in the virtual scene, for example, a hospital or a park, so that the target scene area is clearer, thereby improving recognizability of the target scene area in the virtual scene. Moreover, by matching the marker point location with a building or a geographic element, visually, a geographical range of the target scene area is defined more clearly, thereby improving accuracy of determining the target scene area and improving visual experience of the user.

Furthermore, by specifying the target scene area to a specific ground object element, the currently controlled object is enabled to learn of the target scene area in advance based on a feature, such as an identity or an outline, of the ground object element, to prepare well based on gaming experience before arrival, thereby improving the game experience of the user greatly.

According to a third manner, the terminal looks up, according to location coordinates of the marker point location in the global map, the mapping relationship between the location coordinates and a scene area for the target scene area corresponding to the location coordinates in the virtual scene.

In the embodiments of the present disclosure, the global map is actually a thumbnail of the virtual scene scaled down according to a preset proportion. The location point in the global map may be used for representing a scene area in the virtual scene, and the terminal may associatively store a correspondence between the location coordinates in the global map and the scene area in the virtual scene in advance. The terminal determines a scene area corresponding to the location coordinates from the mapping relationship between the location coordinates and the scene area according to the location coordinates of the marker point location in the global map, and uses the scene area as the target scene area corresponding to the marker point location.

In a possible implementation, the terminal may alternatively transmit the target scene area to the associated object, to enable the associated object to learn of the target scene area. The terminal may alternatively transmit the marker point location to the associated object, and then the associated object determines the target scene area based on the marker point location. Certainly, the terminal may alternatively transmit the marker point location and the target scene area to the associated object. No specific limitation is imposed in this embodiment of the present disclosure.

By storing the mapping relationship between the location coordinates and the scene area, the terminal may rapidly determine the target scene area based on the mapping relationship directly, thereby improving processing efficiency of the terminal greatly.

In a process in which the currently controlled object gradually moves to the target scene area, because of a limited range of the viewing angle image of the currently controlled object, when the target scene area is relatively far away from the location of the currently controlled object, the target scene area may possibly not be located in the viewing angle image. Therefore, the terminal may further determine whether the viewing angle image includes the target scene area based on the viewing angle image of the currently controlled object and the location of the target scene area, and marks the target scene area based on a determining result.

203. The terminal displays a prompt signal in the viewing angle image in a direction toward the target scene area in a case that the viewing angle image does not include the target scene area.

The viewing angle image is a virtual scene observable in the viewing angle range of the currently controlled object in the virtual scene, and the prompt signal is used for prompting a location of the target scene area in the viewing angle image. When the controlled object is relatively far away from the target scene area, the terminal may display the prompt signal at a horizon line location in the viewing angle image along the direction toward the target scene area. The prompt signal may be a wisp of smoke, a flashing signal light, or the like at a distant horizon line location along the direction toward the target scene area.

By displaying the prompt signal, the terminal can vividly depict, in the virtual scene, a general direction of the target scene area even if the range of the viewing angle image of the currently controlled object is limited, to guide the currently controlled object to move in a direction toward the target scene area, so that the currently controlled object can rapidly find the target scene area.

204. The terminal displays the prompt signal in a second preset range of the target scene area in the viewing angle image in a case that the viewing angle image includes the target scene area.

The prompt signal may be a text prompt, an icon prompt, and/or a special display effect. The terminal may display the prompt signal in the second preset range of the target scene area in the viewing angle image, so that the currently controlled object can find the target scene area accurately. The second preset range may be an area in which the target scene area is located, an upper right corner area of the target scene area, or the like, and is not specifically limited in the embodiments of the present disclosure.

Based on several possibilities of the prompt signal, this step may be implemented in the following three manners.

According to a first manner, when the prompt signal is a text prompt, this step may be that: the terminal displays the text prompt in a third preset range corresponding to the target scene area in the viewing angle image.

In this step, the terminal may store the text prompt corresponding to the target scene area in advance, and after determining the target scene area, the terminal obtains the text prompt corresponding to the target scene area from a designated storage space, and inserts the text prompt into the third preset range of the target scene area.

The third preset range and the second preset range may be the same or different. The third preset range may be the upper right corner area in the target scene area, a center area in the target scene area, or the like. The text prompt may be set based on requirements of the user, and is not specifically limited in the embodiments of the present disclosure. For example, the text prompt may be "Here is the destination!", "The destination is here!", or the like.

According to a second manner, when the prompt signal is an icon prompt, this step may be that: the terminal adds the icon prompt in a fourth preset range corresponding to the target scene area in the viewing angle image.

The icon prompt may be set based on the requirements of the user, and is not specifically limited in the embodiments of the present disclosure. For example, the icon prompt may be a finger icon, a flag icon, or the like pointing to the target scene area. A specific implementation of this step is similar to the first manner, and details are not described herein again.

According to a third manner, when the prompt signal is the special display effect, this step may be that: the terminal adds the special display effect in a fifth preset range corresponding to the target scene area in the viewing angle image.

In this step, the special display effect may be displaying the target scene area with changing colors, adding some dynamic pictures in the target scene area, flickeringly displaying the flicker target scene area, or the like. Specifically, this step may be that: the terminal changes an original display color of the target scene area into a target color, or displays a dynamic picture on an upper layer of a layer of the target scene area, or plays a special flicker effect in the fifth preset range.

The terminal may implement the procedure of adding the special display effect in a manner of adding a layer. Specifically, the terminal may add a layer on the upper layer of the layer of the target scene area, if the terminal changes the original display color of the target scene area into the target color, in the added layer, the terminal may depict the target color in an area corresponding to the added layer in the target scene area. If the terminal displays the dynamic picture on the upper layer of the layer of the target scene area, in the added layer, the terminal may depict the dynamic picture in a surrounding area corresponding to the target scene area. The dynamic picture may be a picture of smog moving around the target scene area, a picture in which an associated teammate who has arrived at the target scene area jumps, or the like.

In addition, if the terminal displays the flicker special effect in the fifth preset range corresponding to the target scene area, the terminal may highlight the target scene area once every preset period, to flickeringly display the target scene area.

The target color is different from the original display color of the target scene area, or the target color may be different from a display color of a surrounding scene area of the target scene area, and the terminal may use a color different from the original display color as the target color according to the original display color of the target scene area. Alternatively, the terminal may use a color different from the display color of the surrounding scene area as the target color, so that the target scene area may be clearly distinguished from the surrounding scene area.

Figure 10:
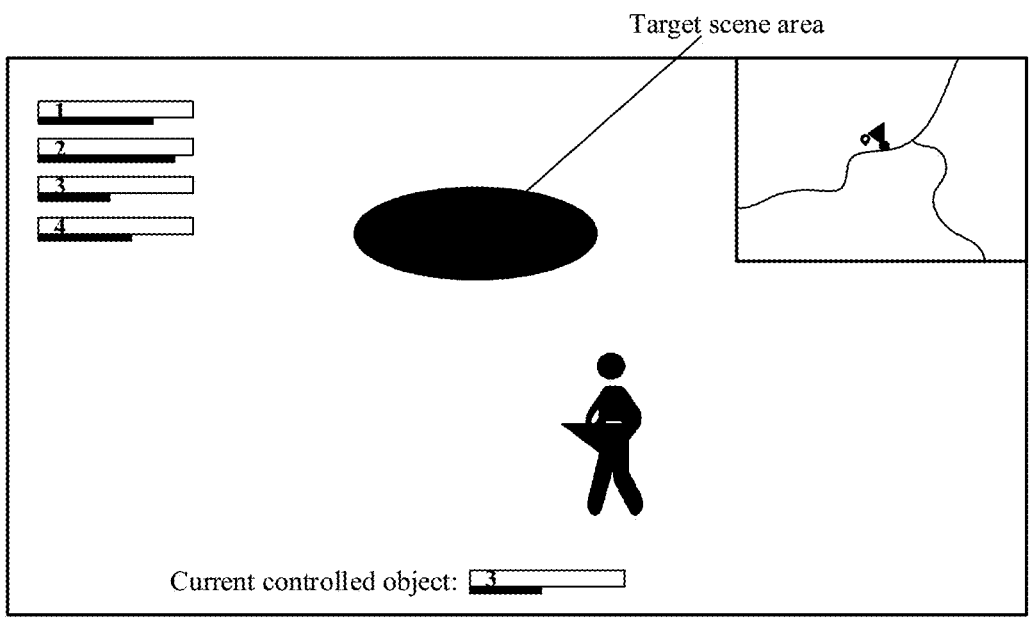
FIG. 10 is a schematic diagram of a display interface according to an embodiment of the present disclosure.
Figure 11:
FIG. 11 is an example diagram of a display interface according to an embodiment of the present disclosure.

As shown in FIG. 10, the terminal may change the target scene area into the target color, to distinguish the target scene area from other areas in the viewing angle image. FIG. 11 is a schematic diagram of an actual terminal interface display, and with reference to a schematic diagram of effect comparison shown in FIG. 11, a specific display effect thereof may be seen more obviously.

The terminal adds any one of the foregoing special display effects in the target scene area, so that the target scene area can be clearly distinguished from the surrounding area vividly, to attract attention of the currently controlled object, thereby produce a striking prompt effect. Moreover, the terminal displays prompt signals in various forms, such as the text prompt, the icon prompt, or the special display effect, in a preset range of the target scene area to prompt the user, thereby improving interestingness in a gaming process, and increasing interest of the user.

In step 204, the terminal may further add any two or all of the text prompt, the icon prompt, or the special display effect for the target scene area by using the foregoing three implementations, to highlight the location of the target scene area in the viewing angle image, thereby producing a striking prompt effect.

The foregoing step 203 to step 204 are actually a specific implementation of "that the terminal displays the prompt signal in the viewing angle image of the currently controlled object", and the foregoing steps are that, in a process in which the currently controlled object arrives at the target scene area from far to near, the terminal may provide the prompt signal of the target scene area all the time. However, the terminal may alternatively display the prompt signal only when a current state of the currently controlled object satisfies a target display condition. Certainly, the target display condition may be set based on requirements, and is not specifically limited in this embodiment of the present disclosure. For example, the target display condition may be that: a distance between the location of the currently controlled object and the target scene area is not more than a target distance, a current user corresponding to the currently controlled object triggers a prompt request, the currently controlled object is hit, and the like.

205. The terminal stops displaying the prompt signal in the viewing angle image in a case that the location of the currently controlled object is located in the target scene area, or the marker point location is updated.

In the embodiments of the present disclosure, the marker point location has specific time validity, the terminal may determine whether to continue providing a prompt for the target scene area corresponding to the marker point location based on current time validity of the marker point location. In a case that the currently controlled object arrives at the target scene area, or the marker point location is updated, the marker point location is invalid.

The terminal may monitor a location of the currently controlled object in real time, and determine, based on the location, whether the currently controlled object arrives at the target scene area. When the location of the currently controlled object is in the target scene area, the terminal determines that the currently controlled object arrives at the target scene area, and stops performing step 203 or step 204. In a movement process of the currently controlled object, the marker point location may be updated in real time, and when the marker point location in the global map is updated as a marker point location different from the marker point location, the terminal also stops performing step 203 or step 204.

The marker point location may be updated by the currently controlled object, or may be updated by the associated object of the currently controlled object. If the currently controlled object updates the marker point location, that is, the process in which the terminal determines the marker point location again based on the selection operation is similar to step 201, and details are not described herein again. If the marker point location is updated by the associated object, the terminal receives an updated marker point location transmitted by a terminal of the associated object, and displays the updated marker point location in the global map, and the terminal determines and marks a target scene area indicated by the updated marker point location through the procedure shown in step 202 to step 204.

Figure 12:
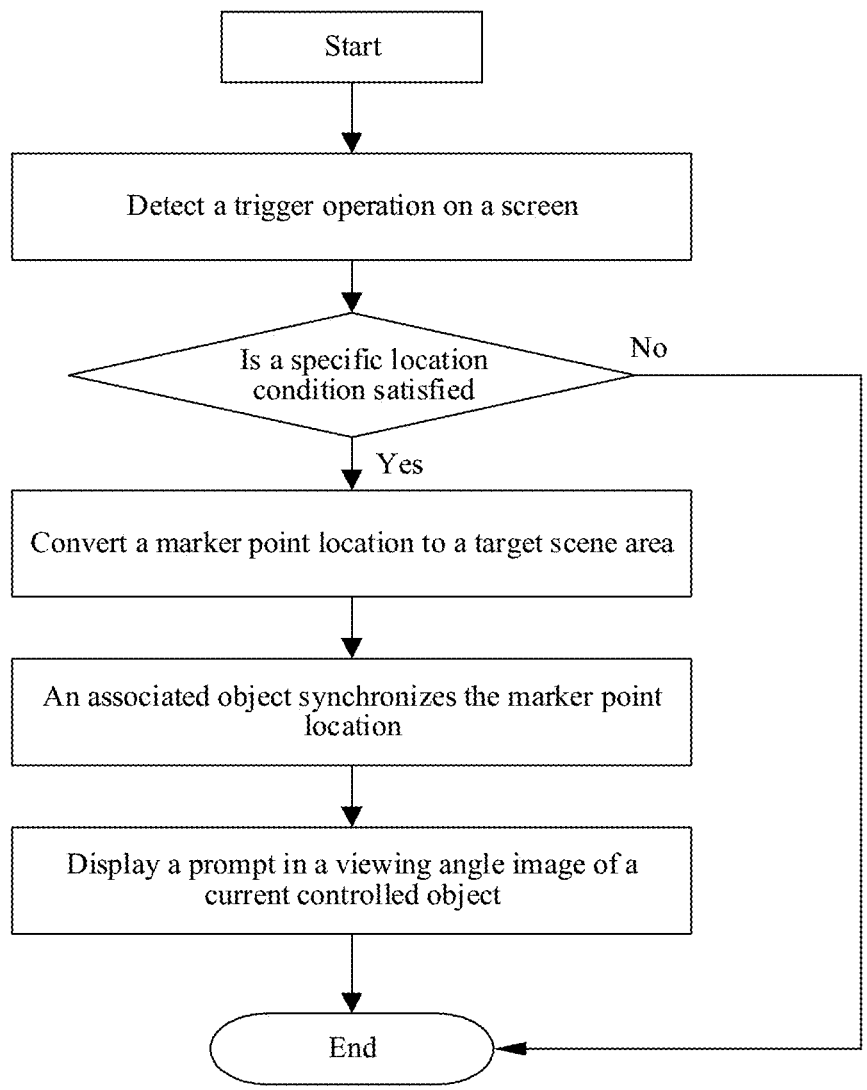
FIG. 12 is a flowchart of a method for displaying a marker point location according to an embodiment of the present disclosure.

To describe the implementation process of this embodiment more clearly, only a flowchart shown in FIG. 12 is used as an example for describing the procedure of the entire solution. With reference to FIG. 12, when detecting a trigger operation on a screen, the terminal determines whether the trigger operation satisfies a specific location condition, and the specific location condition may be that an operating location of the trigger operation falls within the preset area. When the specific location condition is satisfied, the terminal obtains the marker point location in the global map, and converts the marker point location into a target scene area in the virtual scene. In addition, the terminal may further synchronize the marker point location to the terminal of the associated object, and mark the target scene area in the viewing angle image of the currently controlled object, so that the currently controlled object may learn of a location of the target scene area clearly. Even if the location of the currently controlled object displayed by the terminal in the global map coincides with the marker point location, because further determining may be performed by the currently controlled object based on the target scene area marked in the viewing angle image, that the currently controlled object arrives at the marker point location is determined only when the currently controlled object is in the target scene area, to resolve a problem of wrong determining caused by low precision of the global map, thereby improving accuracy of the determining, and further producing an accurate display effect.

In the embodiments of the present disclosure, when the terminal obtains the marker point location in the global map, the terminal may display the prompt signal in the viewing angle image of the currently controlled object based on the target scene area indicated by the marker point location in the virtual scene, to mark the location of the target scene area in the virtual scene clearly and accurately, so that the currently controlled object may arrive at the target scene area accurately and quickly according to the prompt signal, thereby improving accuracy of actual display of the marker point location greatly.

Figure 13:
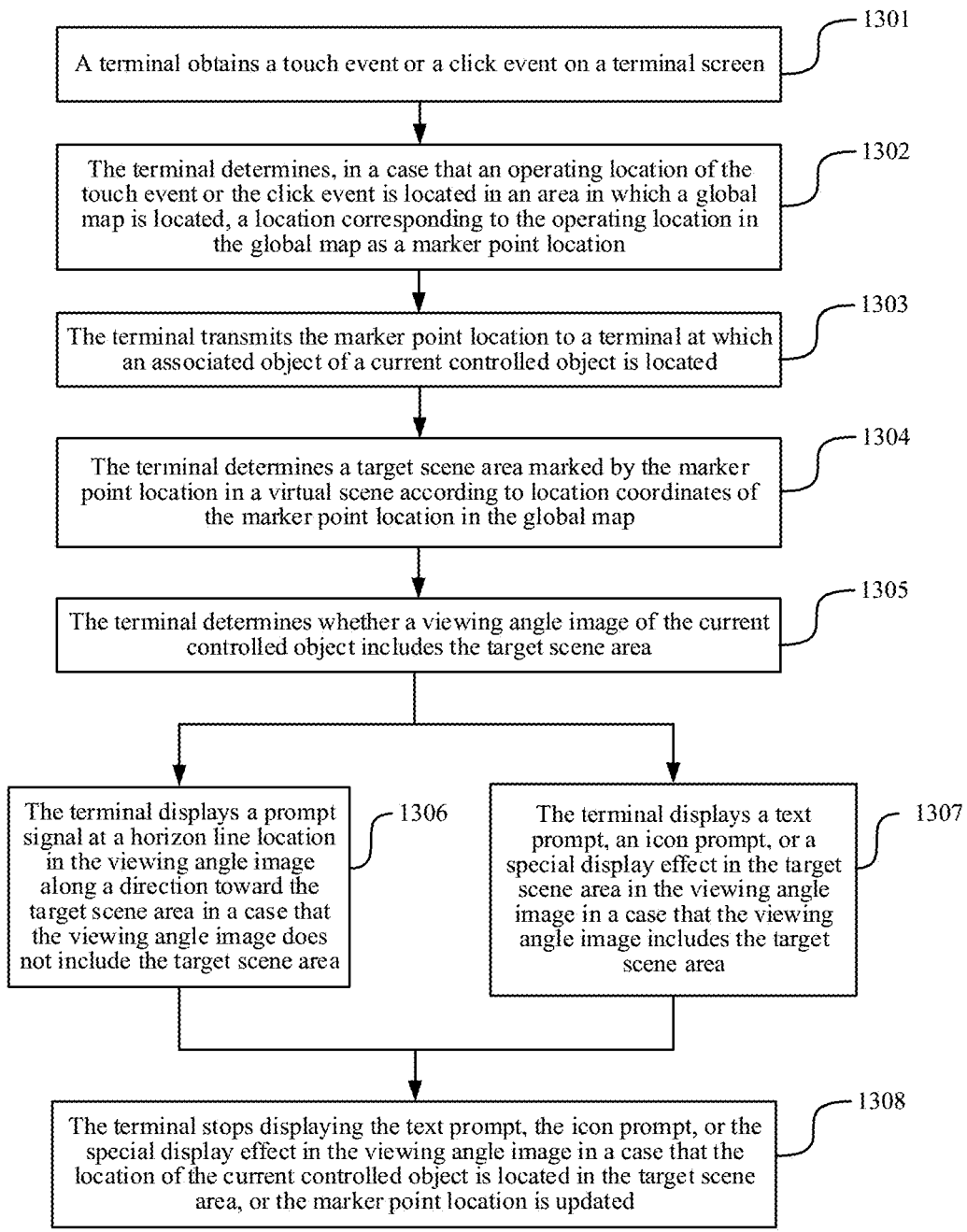
FIG. 13 is a flowchart of a method for displaying a marker point location according to an embodiment of the present disclosure.

FIG. 13 is a flowchart of a method for displaying a marker point location according to an embodiment of the present disclosure. The method may be applied to a terminal. With reference to FIG. 13, the method includes:

1301. The terminal obtains a touch event or a click event on a terminal screen.

As shown in FIG. 3, FIG. 3 is an application interface of a game application. A user may perform an operation on the application interface, for example, to perform a screen touch operation of a finger or a click operation of a mouse on the application interface.

1302. The terminal determines, in a case that an operating location of the touch event or the click event is located in an area in which a global map is located, a location corresponding to the operating location in the global map as a marker point location.

As shown in FIG. 3, the terminal may present the global map in an upper right corner of the current display interface, and when the operating location of the touch event or the click event is located at any location in the global map in the upper right corner, the terminal may mark the location with an icon of a water droplet.

As shown in FIG. 5, when the operating location of the touch event or the click event is located in the global map in the upper right corner, the terminal may further switch to a right half screen area to display the global map.

1303. The terminal transmits the marker point location to a terminal at which an associated object of a currently controlled object is located.

As shown in FIG. 7, the terminal may further display a location of the associated object in the current display interface.

1304. The terminal determines a target scene area marked by the marker point location in a virtual scene according to location coordinates of the marker point location in the global map.

The target scene area may be an area in a first preset range of a scene location coordinates corresponding to the marker point location in the virtual scene; or an area in which a ground object element corresponding to the scene location coordinates is located; or a scene area corresponding to location coordinates of the marker point location in the global map in a correspondence between the location coordinates and the scene area.

As shown in FIG. 9, the terminal may use a circular area, with the scene location coordinates as a center of a circle, that is, a point O, and R as a radius, as the target scene area. The terminal may alternatively use a square, with the scene location coordinates as a center and a preset distance as a side length, as the target scene area.

1305. The terminal determines whether a viewing angle image of the currently controlled object includes the target scene area.

The viewing angle image is a virtual scene observable in a viewing angle range of the currently controlled object in the virtual scene.

1306. The terminal displays a prompt signal at a horizon line location in the viewing angle image along a direction toward the target scene area in a case that the viewing angle image does not include the target scene area.

The prompt signal may be a wisp of smoke, a flashing signal light, or the like at a distant horizon line location along the direction toward the target scene area.

1307. The terminal displays a text prompt, an icon prompt, or a special display effect in the target scene area in the viewing angle image in a case that the viewing angle image includes the target scene area.

As shown in FIG. 10, the target scene area may be a circular area, and the terminal may highlight the circular area with a target color different from surrounding colors to distinguish the circular area from other areas in the viewing angle image.

1308. The terminal stops displaying the text prompt, the icon prompt, or the special display effect in the viewing angle image in a case that the location of the currently controlled object is located in the target scene area, or the marker point location is updated.

A procedure of step 1301 to step 1308 is similar to the procedure of step 201 to step 205 in the previous embodiment, and the specific procedure of step 1301 to step 1308 is not described again in this embodiment of the present disclosure.

In the embodiments of the present disclosure, the terminal obtains the marker point location in the global map, synchronizes the marker point location to the associated object, and clearly and accurately marks the scene area corresponding to the marker point location in the viewing angle image of the currently controlled object based on the marker point location, so that the currently controlled object may arrive at the target scene area accurately and rapidly according to the prompt signal, thereby greatly improving accuracy of actual display of the marker point location.

Figure 14:
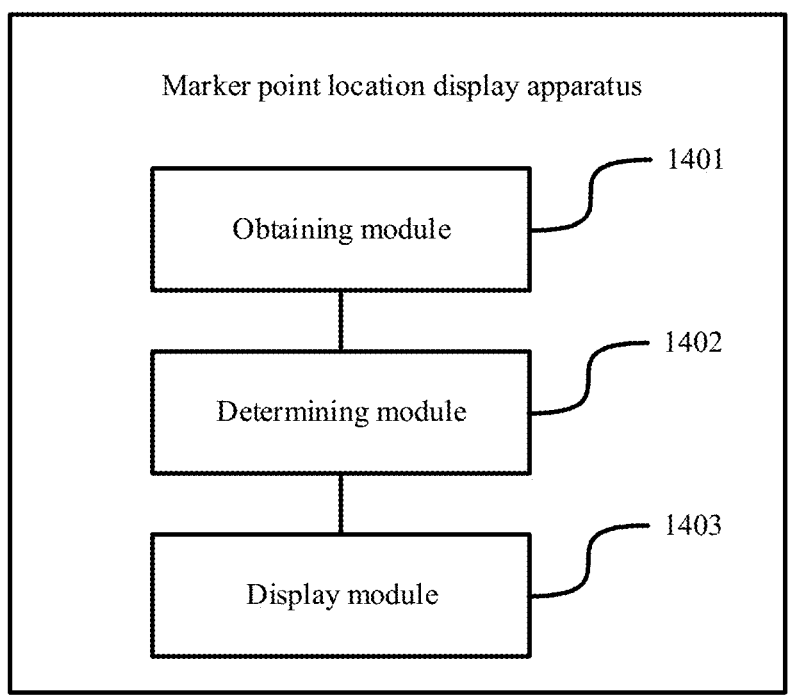
FIG. 14 is a schematic structural diagram of a marker point location display apparatus according to an embodiment of the present disclosure.

FIG. 14 is a schematic structural diagram of a marker point location display apparatus according to an embodiment of the present disclosure. With reference to FIG. 14, the apparatus includes: an obtaining module 1401, a determining module 1402, and a display module 1403.

The obtaining module 1401 is configured to obtain a marker point location in a global map of a virtual scene, the global map being configured to display a thumbnail of the virtual scene.

The determining module 1402 is configured to determine a target scene area indicated by the marker point location in the virtual scene, the target scene area being an area marked by the marker point location.

The display module 1403 is configured to display a prompt signal in a viewing angle image of a currently controlled object, the prompt signal being used for prompting a location of the target scene area in the virtual scene, and the viewing angle image being a virtual scene observable in a viewing angle range of the currently controlled object in the virtual scene.

Optionally, the determining module 1402 is further configured to determine scene location coordinates corresponding to the marker point location in the virtual scene according to location coordinates of the marker point location in the global map, and determine an area within a first preset range of the scene location coordinates as the target scene area.

Optionally, the determining module 1402 is further configured to determine scene location coordinates of the marker point location in the virtual scene according to location coordinates of the marker point location in the global map, and determine an area corresponding to a ground object element at the scene location coordinates as the target scene area.

Optionally, the determining module 1402 is further configured to look up, according to location coordinates of the marker point location in the global map, a correspondence between the location coordinates and a scene area for the target scene area corresponding to the location coordinates in the virtual scene.

Optionally, the display module 1403 is further configured to display the prompt signal in a second preset range of the target scene area in a case that the viewing angle image of the currently controlled object includes the target scene area.

Optionally, the display module 1403 is further configured to display the prompt signal in the viewing angle image in a direction toward the target scene area in a case that the viewing angle image of the currently controlled object does not include the target scene area.

Optionally, the display module 1403 is further configured to display a text prompt in a third preset range corresponding to the target scene area in the viewing angle image.

Optionally, the display module 1403 is further configured to add an icon prompt in a fourth preset range corresponding to the target scene area in the viewing angle image.

Optionally, the display module 1403 is further configured to add a special display effect in a fifth preset range corresponding to the target scene area in the viewing angle image.

Optionally, the display module 1403 is further configured to change an original display color of the target scene area into a specified color.

Optionally, the display module 1403 is further configured to display a dynamic picture on an upper layer of a layer of the target scene area.

Optionally, the display module 1403 is further configured to play a special flicker effect in the fifth preset range.

Optionally, the apparatus further includes:

a stop module, configured to stop displaying the prompt signal in the viewing angle image in a case that a location of the currently controlled object is located in the target scene area, or the marker point location is updated.

Optionally, the obtaining module 1401 is further configured to obtain, in a case that a selection operation on the global map is detected, location coordinates selected through the selection operation and determine a location corresponding to the location coordinates as the marker point location.

Optionally, the obtaining module 1401 is further configured to receive the marker point location selected by an associated object of the currently controlled object.

In the embodiments of the present disclosure, when the terminal obtains the marker point location in the global map, the terminal may display the prompt signal in the viewing angle image of the currently controlled object based on the target scene area indicated by the marker point location in the virtual scene, to mark the location of the target scene area in the virtual scene clearly and accurately, so that the currently controlled object may arrive at the target scene area accurately and quickly according to the prompt signal, thereby improving accuracy of actual display of the marker point location greatly.

Any combination of the foregoing optional technical solutions may be used to obtain an optional embodiment of the present disclosure. Details are not described herein again.

When the marker point location display apparatus provided in the foregoing embodiments performs marker point location display, only division of the foregoing functional modules is used as an example for description. In an actual application, the foregoing functions may be assigned according to requirements to different functional modules for implementation. That is, the internal structure of the terminal is divided into different functional modules, to implement some or all of the functions described above. In addition, the marker point location display apparatus provided in the foregoing embodiments and the embodiments of the method for displaying a marker point location belong to the same concept. For the specific implementation process, reference may be made to the method embodiments, and details are not described herein again.

Any combination of the foregoing optional technical solutions may be used to obtain an optional embodiment of the present disclosure. Details are not described herein again.

When the marker point location display apparatus provided in the foregoing embodiments performs marker point location display, only division of the foregoing functional modules is used as an example for description. In an actual application, the foregoing functions may be assigned according to requirements to different functional modules for implementation. That is, the internal structure of the terminal is divided into different functional modules, to implement some or all of the functions described above. In addition, the marker point location display apparatus provided in the foregoing embodiments and the embodiments of the method for displaying a marker point location belong to the same concept. For the specific implementation process, reference may be made to the method embodiments, and details are not described herein again.

Figure 15:
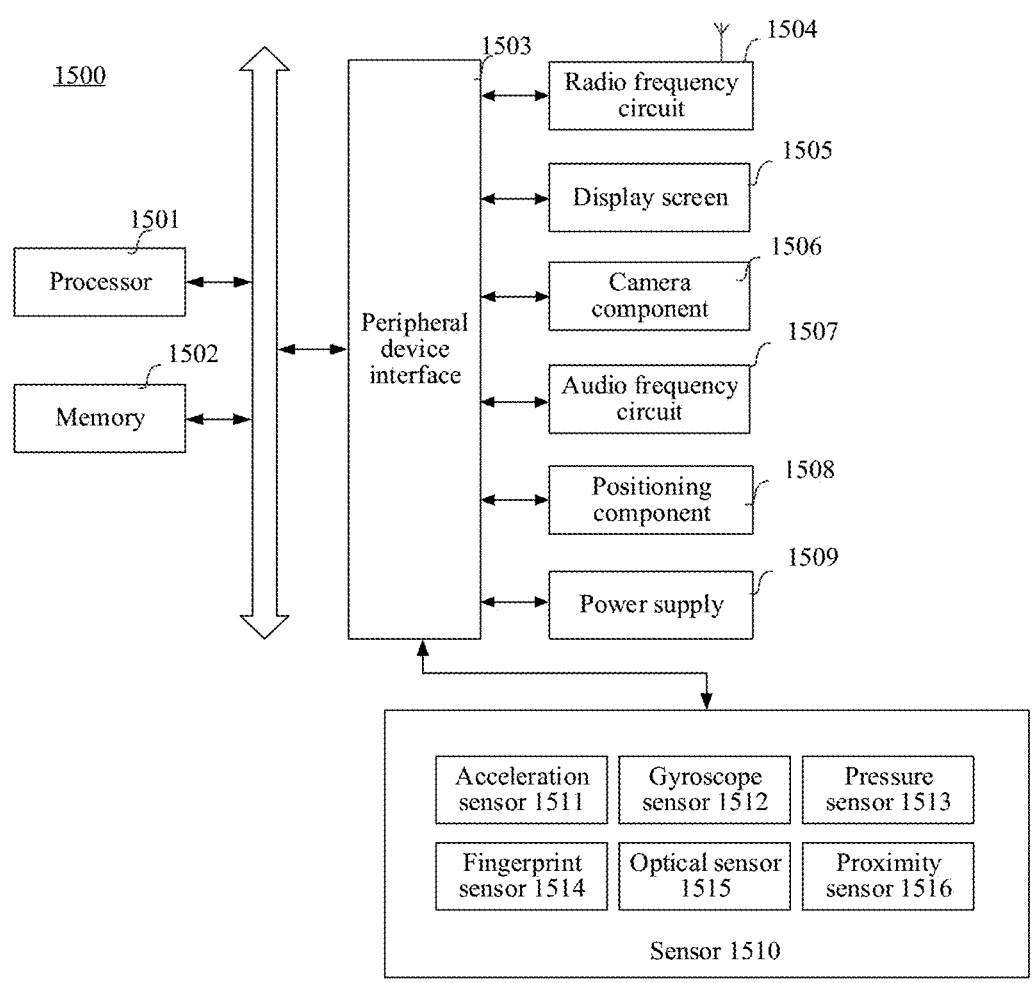
FIG. 15 is a structural block diagram of an electronic device 1500 according to an exemplary embodiment of the present disclosure.

FIG. 15 is a structural block diagram of an electronic device 1500 according to an exemplary embodiment of the present disclosure. The electronic device 1500 may be a smartphone, a tablet computer, a moving picture experts group audio layer III (MP3) player, a moving picture experts group audio layer IV (MP4) player, a notebook computer, or a desktop computer. The electronic device 1500 may also be referred to as another name such as user equipment, a portable terminal, a laptop terminal, or a desktop terminal.

Generally, the electronic device 1500 includes a processor 1501 and a memory 1502.

The processor 1501 may include one or more processing cores, and may be, for example, a 4-core processor or an 8-core processor. The processor 1501 may be implemented in at least one hardware form of digital signal processing (DSP), a field-programmable gate array (FPGA), and a programmable logic array (PLA). The processor 1501 may also include a main processor and a coprocessor. The main processor is a processor configured to process data in an awake state, and is also referred to as a central processing unit (CPU). The coprocessor is a low power consumption processor configured to process data in a standby state. In some embodiments, the processor 1501 may be integrated with a graphics processing unit (GPU). The GPU is configured to be responsible for rendering and depicting content that a display screen needs to display. In some embodiments, the processor 1501 may further include an artificial intelligence (AI) processor. The AI processor is configured to process a computing operation related to machine learning.

The memory 1502 may include one or more computer-readable storage media. The computer-readable storage media may be non-transient. The memory 1502 may further include a high-speed random access memory, and a non-volatile memory such as one or more magnetic disk storage devices and a flash memory device. In some embodiments, the non-transient computer-readable storage medium in the memory 1502 is configured to store at least one instruction, the at least one instruction being configured to, when executed by the processor 1501, implement the following steps in the method for displaying a marker point location provided in the method embodiments of this application:

obtaining a marker point location in a global map of a virtual scene, the global map being configured to display a thumbnail of the virtual scene;

determining a target scene area indicated by the marker point location in the virtual scene, the target scene area being an area marked by the marker point location; and displaying a prompt signal in a viewing angle image of a currently controlled object, the prompt signal being used for prompting a location of the target scene area in the virtual scene, and the viewing angle image being a virtual scene observable in a viewing angle range of the currently controlled object in the virtual scene.

In a possible implementation, the processor 1501 is further configured to perform the following step:

determining scene location coordinates corresponding to the marker point location in the virtual scene according to location coordinates of the marker point location in the global map, and determining an area within a first preset range of the scene location coordinates as the target scene area.

In a possible implementation, the processor 1501 is further configured to perform the following step:

determining scene location coordinates of the marker point location in the virtual scene according to location coordinates of the marker point location in the global map, and determining an area corresponding to a ground object element at the scene location coordinates as the target scene area.

In a possible implementation, the processor 1501 is further configured to perform the following step:

looking up, according to location coordinates of the marker point location in the global map, a correspondence between the location coordinates and a scene area for the target scene area corresponding to the location coordinates in the virtual scene.

In a possible implementation, the processor 1501 is further configured to perform the following step:

displaying the prompt signal in a second preset range of the target scene area in a case that the viewing angle image of the currently controlled object includes the target scene area.

In a possible implementation, the processor 1501 is further configured to perform the following step:

displaying the prompt signal in the viewing angle image in a direction toward the target scene area in a case that the viewing angle image of the currently controlled object does not include the target scene area.

In a possible implementation, the processor 1501 is further configured to perform the following step:

displaying a text prompt in a third preset range corresponding to the target scene area in the viewing angle image.

In a possible implementation, the processor 1501 is further configured to perform the following step:

adding an icon prompt in a fourth preset range corresponding to the target scene area in the viewing angle image.

In a possible implementation, the processor 1501 is further configured to perform the following step:

adding a special display effect in a fifth preset range corresponding to the target scene area in the viewing angle image.

In a possible implementation, the processor 1501 is further configured to perform the following step:

changing an original display color of the target scene area into a target color.

In a possible implementation, the processor 1501 is further configured to perform the following step:

displaying a dynamic picture on an upper layer of a layer of the target scene area.

In a possible implementation, the processor 1501 is further configured to perform the following step:

playing a special flicker effect in the fifth preset range.

In a possible implementation, the processor 1501 is further configured to perform the following step:

stopping displaying the prompt signal in the viewing angle image in a case that a location of the currently controlled object is located in the target scene area, or the marker point location is updated.

In a possible implementation, the processor 1501 is further configured to perform the following step:

obtaining, in a case that a selection operation on the global map is detected, location coordinates selected through the selection operation and determining a location corresponding to the location coordinates as the marker point location.

In a possible implementation, the processor 1501 is further configured to perform the following step:

receiving the marker point location selected by an associated object of the currently controlled object.

In some embodiments, the electronic device 1500 may further optionally include a peripheral device interface 1503 and at least one peripheral device. The processor 1501, the memory 1502, and the peripheral device interface 1503 may be connected through a bus or a signal cable. Each peripheral device may be connected to the peripheral device interface 1503 through a bus, a signal cable, or a circuit board. Specifically, the peripheral device includes: at least one of a radio frequency (RF) circuit 1504, a touch display screen 1505, a camera component 1506, an audio frequency circuit 1507, a positioning component 1508, and a power supply 1509.

The peripheral device interface 1503 may be configured to connect at least one peripheral device related to input/output (I/O) to the processor 1501 and the memory 1502. In some embodiments, the processor 1501, the memory 1502, and the peripheral device interface 1503 are integrated into the same chip or circuit board. In some other embodiments, any one or two of the processor 1501, the memory 1502, and the peripheral device interface 1503 may be implemented on an independent chip or circuit board, and the implementation is not limited in this embodiment.

The RF circuit 1504 is configured to receive and transmit an RF signal, also referred to as an electromagnetic signal. The RF circuit 1504 communicates with a communications network and another communications device by using the electromagnetic signal. The RF circuit 1504 may convert an electric signal into an electromagnetic signal for transmission, or convert a received electromagnetic signal into an electric signal. Optionally, the RF circuit 1504 includes an antenna system, an RF transceiver, one or more amplifiers, a tuner, an oscillator, a digital signal processor, a codec chip set, a subscriber identity module card, and the like. The RF circuit 1504 may communicate with another terminal by using at least one type of wireless communication protocols. The wireless communication protocol includes, but is not limited to, a metropolitan area network, generations of mobile communications networks (2G, 3G, 4G, and 5G), a wireless local area network, and/or a wireless fidelity (Wi-Fi) network. In some embodiments, the RF circuit 1504 may further include a near field communication (NFC) related circuit, and is not limited in this application.

The display screen 1505 is configured to display a user interface (UI). The UI may include a graph, text, an icon, a video, and any combination thereof. In a case that the display screen 1505 is a touch display screen, the display screen 1505 is further capable of collecting a touch signal on or over a surface of the display screen 1505. The touch signal may be inputted into the processor 1501 as a control signal for processing. In this case, the display screen 1505 may be further configured to provide a virtual button and/or a virtual keyboard, also referred to as a soft button and/or a soft keyboard. In some embodiments, there is one display screen 1505, disposed on a front panel of the electronic device 1500. In some other embodiments, there may be at least two display screens 1505, respectively disposed on different surfaces of the electronic device 1500 or designed in a foldable shape. In still some other embodiments, the display screen 1505 may be a flexible display screen, disposed on a curved surface or a folded surface of the electronic device 1500. Even, the display screen 1505 may be further set to have a non-rectangular irregular graph, that is, a special-shaped screen. The display screen 1505 may be manufactured by using a material such as a liquid crystal display (LCD), an organic light-emitting diode (OLED), or the like.

The camera component 1506 is configured to collect an image or a video. Optionally, the camera component 1506 includes a front-facing camera and a rear-facing camera. Generally, the front-facing camera is disposed on a front panel of the terminal, and the rear-facing camera is disposed on a back face of the terminal. In some embodiments, there are at least two rear-facing cameras, each being any one of a main camera, a depth of field camera, a wide-angle camera, and a telephoto camera, to implement a Bokeh function through fusion of the main camera and the depth of field camera, panoramic photo shooting and virtual reality (VR) shooting functions through fusion of the main camera and wide-angle camera, or another fusion shooting function. In some embodiments, the camera component 1506 may further include a flash. The flash may be a single color temperature flash or a double color temperature flash. The double color temperature flash refers to a combination of a warm flash and a cold flash, and may be configured to perform light ray compensation at different color temperatures.

The audio frequency circuit 1507 may include a microphone and a loudspeaker. The loudspeaker is configured to collect sound waves of a user and an environment, and convert the sound waves into electric signals and input the electrical signals into the processor 1501 for processing, or input the electrical signals into the radio frequency circuit 1504 to implement speech communication. For the purpose of stereo sound collection or noise reduction, there may be a plurality of microphones, respectively disposed at different parts of the electronic device 1500. The microphone may be further a microphone array or an omni-directional collection microphone. The loudspeaker is configured to convert electric signals from the processor 1501 or the RF circuit 1504 into sound waves. The loudspeaker may be a conventional thin-film loudspeaker or a piezoelectric ceramic loudspeaker. In a case that the loudspeaker is the piezoelectric ceramic loudspeaker, electric signals not only can be converted into sound waves that can be heard by human, but also can be converted into sound waves that cannot be heard by human for ranging and the like. In some embodiments, the audio frequency circuit 1507 may further include an earphone jack.

The positioning component 1508 is configured to position a current geographic location of the electronic device 1500, to implement a navigation or a location based service (LBS). The positioning component 1508 may be a positioning component based on the global positioning system (GPS) of the United States, the BeiDou Navigation Satellite System of China, the Glonass system of Russia, or the Galileo system of the European Union.

The power supply 1509 is configured to supply power to components in the electronic device 1500. The power supply 1509 may be an alternating current, a direct current, a primary battery, or a rechargeable battery. In a case that the power supply 1509 includes the rechargeable battery, the rechargeable battery may support a wired charging or a wireless charging. The rechargeable battery may be further configured to support a quick charge technology.

In some embodiments, the electronic device 1500 further includes one or more sensors 1510. The one or more sensors 1510 include, but are not limited to, an acceleration sensor 1511, a gyroscope sensor 1512, a pressure sensor 1513, a fingerprint sensor 1514, an optical sensor 1515, and a proximity sensor 1516.

The acceleration sensor 1511 may detect acceleration on three coordinate axes of a coordinate system established by the electronic device 1500. For example, the acceleration sensor 1511 may be configured to detect components of gravity acceleration on the three coordinate axes. The processor 1501 may control, according to a gravity acceleration signal collected by the acceleration sensor 1511, the touch display screen 1505 to display the UI in a frame view or a portrait view. The acceleration sensor 1511 may be further configured to collect motion data of a game or a user.

The gyroscope sensor 1512 may detect a body direction and a rotation angle of the electronic device 1500. The gyroscope sensor 1512 may cooperate with the acceleration sensor 1511 to collect a 3D action performed by the user on the electronic device 1500. The processor 1501 may implement the following functions according to data collected by the gyroscope sensor 1512: motion sensing (for example, the UI is changed according to a tilt operation of the user), image stabilization during shooting, game control, and inertial navigation.

The pressure sensor 1513 may be disposed on a side frame of the electronic device 1500 and/or a lower layer of the touch display screen 1505. In a case that the pressure sensor 1513 is disposed on the side frame of the electronic device 1500, a holding signal of the user on the electronic device 1500 may be detected. The processor 1501 performs left and right hand recognition or a quick operation according to the holding signal collected by the pressure sensor 1513. In a case that the pressure sensor 1513 is disposed on the low layer of the touch display screen 1505, the processor 1501 controls, according to a pressure operation of the user on the touch display screen 1505, an operable control on the UI interface. The operable control includes at least one of a button control, a scroll bar control, an icon control, and a menu control.

The fingerprint sensor 1514 is configured to collect a fingerprint of the user. The processor 1501 identifies an identity of the user according to the fingerprint collected by the fingerprint sensor 1514, or the fingerprint sensor 1514 identifies an identity of the user according to the collected fingerprint. In a case that the identity of the user is identified as a trusted identity, the processor 1501 authorizes the user to perform a related sensitive operation. The sensitive operation includes unlocking a screen, viewing encrypted information, downloading software, payment, changing settings, and the like. The fingerprint sensor 1514 may be disposed on a front face, a back face, or a side face of the electronic device 1500. In a case that a physical button or a vendor logo is disposed on the electronic device 1500, the fingerprint sensor 1514 may be integrated together with the physical button or the vendor logo.

The optical sensor 1515 is configured to collect ambient light intensity. In an embodiment, the processor 1501 may control display luminance of the touch display screen 1505 according to the ambient light intensity collected by the optical sensor 1515. Specifically, in a case that the ambient light intensity is relatively high, the display luminance of the touch display screen 1505 is increased. In a case that the ambient light intensity is relatively low, the display luminance of the touch display screen 1505 is reduced. In another embodiment, the processor 1501 may further dynamically adjust shooting parameters of the camera component 1506 according to the ambient light intensity collected by the optical sensor 1515.

The proximity sensor 1516, also referred to as a distance sensor, is usually disposed on the front panel of the electronic device 1500. The proximity sensor 1516 is configured to collect a distance between a front face of the user and a front face of the electronic device 1500. In an embodiment, in a case that the proximity sensor 1516 detects that the distance between the front face of the user and the front face of the electronic device 1500 is gradually decreased, the processor 1501 controls the touch display screen 1505 to switch from a screen-on state to a screen-off state. In a case that the proximity sensor 1516 detects that the distance between the front face of the user and the front face of the electronic device 1500 is gradually increased, the processor 1501 controls the touch display screen 1505 to switch from the screen-off state to the screen-on state.

A person skilled in the art may understand that a structure shown in FIG. 15 constitutes no limitation on the electronic device 1500, and the electronic device 1500 may include more or fewer components than those shown in the figure, or some components may be combined, or a different component deployment may be used.

In an example of an embodiment, a computer-readable storage medium is further provided, for example, a memory including an instruction, and the foregoing instruction may be executed by a processor in a terminal to implement the method for displaying a marker point location in the foregoing embodiments. For example, the computer-readable storage medium may be a read-only memory (ROM), a random access memory (RAM), a CD-ROM, a magnetic tape, a floppy disk, an optical data storage device, or the like.

A person of ordinary skill in the art may understand that all or some of steps of the embodiments may be implemented by hardware or a program instructing related hardware. The program may be stored in a computer-readable storage medium. The storage medium may be a ROM, a magnetic disk, an optical disc, or the like.

The foregoing descriptions are merely exemplary embodiments of the present disclosure, but are not intended to limit the present disclosure. Any modification, equivalent replacement, and improvement made without departing from the spirit and principle of the present disclosure shall fall within the protection scope of the present disclosure.

What is claimed is:

1. A method for displaying a marker point location performed at an electronic device having one or more processors and memory storing a plurality of programs to be executed by the one or more processors, the method comprising:
    displaying a virtual scene and a global map on a current display interface;
    detecting a trigger operation from a first user on the global map, the global map being configured to display a thumbnail of the virtual scene;
    in response to the trigger operation on the global map of the virtual scene, displaying an enlarged global map of the virtual scene;
    obtaining a user selection of a marker point location on the enlarged global map by the first user, the marker point location indicating a target destination of a first user controlled virtual object;
    in response to the user-selected marker point location on the enlarged global map, determining, within the virtual scene, a target scene area including the target destination of the first user controlled virtual object corresponding to the user-selected marker point location on the enlarged global map and sharing the user-selected marker point location on the enlarged global map with a second user controlled virtual object in the virtual scene associated with another electronic device in the virtual scene; and
    displaying, within the virtual scene, a prompt signal in a viewing angle image of the first user controlled virtual object, the prompt signal being used for prompting a location of the target scene area in the virtual scene, and the viewing angle image being a virtual scene observable in a viewing angle range of the first user controlled virtual object in the virtual scene.

2. The method according to claim 1, wherein the determining a target scene area indicated by the marker point location in the virtual scene comprises:
    determining scene location coordinates corresponding to the marker point location in the virtual scene according to location coordinates of the marker point location in the global map; and
    determining an area within a first preset range of the scene location coordinates as the target scene area.

3. The method according to claim 1, wherein the displaying a prompt signal in a viewing angle image of the first user controlled virtual object comprises:
    displaying the prompt signal in a second preset range of the target scene area in a case that the viewing angle image of the first user controlled virtual object comprises the target scene area; and
    displaying the prompt signal in the viewing angle image in a direction toward the target scene area in a case that the viewing angle image of the first user controlled virtual object does not comprise the target scene area.

4. The method according to claim 1, wherein the displaying a prompt signal in a viewing angle image of the first user controlled virtual object comprises:
    displaying one selected from the group consisting of a text prompt, an icon prompt, and a special display effect in a third preset range corresponding to the target scene area in the viewing angle image.

5. The method according to claim 4, wherein the special display effect is one selected from the group consisting of changing an original display color of the target scene area into a target color, displaying a dynamic picture on an upper layer of a layer of the target scene area, and playing a special flicker effect.

6. The method according to claim 1, further comprising:
stopping displaying the prompt signal in the viewing angle image in a case that a location of the first user controlled virtual object is located in the target scene area, or the marker point location is updated.

7. The method according to claim 1, wherein the obtaining a marker point location in a global map of a virtual scene comprises:
obtaining, in a case that a selection operation by an associated object of the first user controlled virtual object on the global map is detected, location coordinates selected through the selection operation; and
determining a location corresponding to the location coordinates as the marker point location.

8. An electronic device, comprising:
one or more processors; and
a memory configured to store a computer program;
the processor being configured to execute the computer program stored in the memory to implement the following operations:
displaying a virtual scene and a global map on a current display interface;
detecting a trigger operation from a first user on the global map, the global map being configured to display a thumbnail of the virtual scene;
in response to the trigger operation on the global map of the virtual scene, displaying an enlarged global map of the virtual scene;
obtaining a user selection of a marker point location on the enlarged global map by the first user, the marker point location indicating a target destination of a first user controlled virtual object;
in response to the user-selected marker point location on the enlarged global map, determining, within the virtual scene, a target scene area including the target destination of the first user controlled virtual object corresponding to the user-selected marker point location on the enlarged global map and sharing the user-selected marker point location on the enlarged global map with a second user controlled virtual object in the virtual scene associated with another electronic device in the virtual scene; and
displaying, within the virtual scene, a prompt signal in a viewing angle image of the first user controlled virtual object, the prompt signal being used for prompting a location of the target scene area in the virtual scene, and the viewing angle image being a virtual scene observable in a viewing angle range of the first user controlled virtual object in the virtual scene.

9. The electronic device according to claim 8, wherein the one or more processors are further configured to perform the following operations:
determining scene location coordinates corresponding to the marker point location in the virtual scene according to location coordinates of the marker point location in the global map; and
determining an area within a first preset range of the scene location coordinates as the target scene area.

10. The electronic device according to claim 8, wherein the one or more processors are further configured to perform the following operations:
displaying the prompt signal in a second preset range of the target scene area in a case that the viewing angle image of the first user controlled virtual object comprises the target scene area; and
displaying the prompt signal in the viewing angle image in a direction toward the target scene area in a case that the viewing angle image of the first user controlled virtual object does not comprise the target scene area.

11. The electronic device according to claim 8, wherein the one or more processors are further configured to perform the following operations:
displaying one selected from the group consisting of a text prompt, an icon prompt, and a special display effect in a third preset range corresponding to the target scene area in the viewing angle image.

12. The electronic device according to claim 11, wherein the special display effect is one selected from the group consisting of changing an original display color of the target scene area into a target color, displaying a dynamic picture on an upper layer of a layer of the target scene area, and playing a special flicker effect.

13. The electronic device according to claim 8, wherein the one or more processors are further configured to perform the following operations:
stopping displaying the prompt signal in the viewing angle image in a case that a location of the first user controlled virtual object is located in the target scene area, or the marker point location is updated.

14. The electronic device according to claim 8, wherein the obtaining a marker point location in a global map of a virtual scene comprises:
obtaining, in a case that a selection operation by an associated object of the first user controlled virtual object on the global map is detected, location coordinates selected through the selection operation; and
determining a location corresponding to the location coordinates as the marker point location.

15. A non-transitory computer-readable storage medium, storing at least one instruction, the instruction being loaded and executed by a processor of an electronic device to perform operations including:
displaying a virtual scene and a global map on a current display interface;
detecting a trigger operation from a first user on the global map, the global map being configured to display a thumbnail of the virtual scene;
in response to the trigger operation on the global map of the virtual scene, displaying an enlarged global map of the virtual scene;
obtaining a user selection of a marker point location on the enlarged global map by the first user, the marker point location indicating a target destination of a first user controlled virtual object;
in response to the user-selected marker point location on the enlarged global map, determining, within the virtual scene, a target scene area including the target destination of the first user controlled virtual object corresponding to the user-selected marker point location on the enlarged global map and sharing the user-selected marker point location on the enlarged global map with a second user controlled virtual object in the virtual scene associated with another electronic device in the virtual scene; and
displaying, within the virtual scene, a prompt signal in a viewing angle image of the first user controlled virtual object, the prompt signal being used for prompting a location of the target scene area in the virtual scene, and the viewing angle image being a virtual scene observable in a viewing angle range of the first user controlled virtual object in the virtual scene.

16. The non-transitory computer-readable storage medium according to claim 15, wherein the operations further include:
   determining scene location coordinates corresponding to the marker point location in the virtual scene according to location coordinates of the marker point location in the global map; and
   determining an area within a first preset range of the scene location coordinates as the target scene area.

17. The non-transitory computer-readable storage medium according to claim 15, wherein the operations further include:
   displaying the prompt signal in a second preset range of the target scene area in a case that the viewing angle image of the first user controlled virtual object comprises the target scene area; and
   displaying the prompt signal in the viewing angle image in a direction toward the target scene area in a case that the viewing angle image of the first user controlled virtual object does not comprise the target scene area.

18. The non-transitory computer-readable storage medium according to claim 15, wherein the operations further include:
   displaying one selected from the group consisting of a text prompt, an icon prompt, and a special display effect in a third preset range corresponding to the target scene area in the viewing angle image.

19. The non-transitory computer-readable storage medium according to claim 15, wherein the operations further include:
   stopping displaying the prompt signal in the viewing angle image in a case that a location of the first user controlled virtual object is located in the target scene area, or the marker point location is updated.

20. The non-transitory computer-readable storage medium according to claim 15, wherein the operations further include:
   obtaining, in a case that a selection operation by an associated object of the first user controlled virtual object on the global map is detected, location coordinates selected through the selection operation; and
   determining a location corresponding to the location coordinates as the marker point location.

* * * * *